Figure 1:
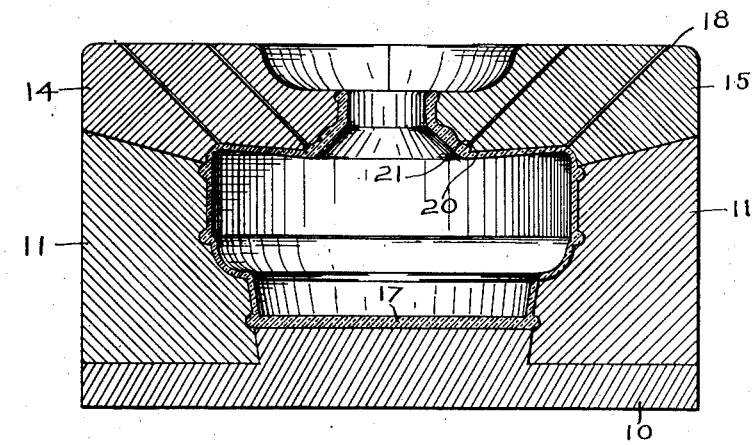

No. 736,790. PATENTED AUG. 18, 1903.
A. B. SCOTT.
GLASS MOLD.
APPLICATION FILED FEB. 9, 1903.
NO MODEL.

WITNESSES: Harry J Pearce, Nellie A Lemong

INVENTOR. Alvin B. Scott
BY V. H. Lockwood
ATTORNEY.

No. 736,790. Patented August 18, 1903.

UNITED STATES PATENT OFFICE.

ALVIN B. SCOTT, OF SUMMITVILLE, INDIANA, ASSIGNOR TO MODEL GLASS WORKS, OF SUMMITVILLE, INDIANA, COPARTNERS.

GLASS-MOLD.

SPECIFICATION forming part of Letters Patent No. 736,790, dated August 18, 1903.

Application filed February 9, 1903. Serial No. 142,662. (No model.)

*To all whom it may concern:*

Be it known that I, ALVIN B. SCOTT, of Summitville, county of Madison, and State of Indiana, have invented a certain new and useful Glass-Mold; and I do hereby declare that the following is a full, clear, and exact description thereof, reference being had to the accompanying drawings, in which like figures refer to like parts.

The object of this invention is to support a portion of the surface of a glass article after it is blown and while it is cooling preparatory to removing the mold from around the article and removing the article from the mold.

Heretofore in blowing certain glass articles—as, for example, lamp-fonts, such as are shown in the drawings hereof—it has been necessary for the blower to hold his breath after the article has been blown and maintain the pressure of air within the article, that the air may hold up the upper surface of the article while it is soft and before it hardens to prevent it from dropping down or sagging. The result of this mode of forming such articles has been that it is difficult for the blower to hold his breath so long, it consumes unnecessary time, and, still worse, the tops of many of the articles drop or sag or have a depression somewhere in them which requires them to be thrown aside as deformities.

This invention accomplishes by mechanical means or by a conformation of the mold what the blower has been required heretofore to do after he had fully blown the article. The nature of it will be understood more fully from the accompanying drawings and the following description and claim.

The drawings herein show the idea constituting the invention embodied in a mold for making lamp-fonts, where it is of great practical value; but the invention is not limited to molds for making such articles.

Figure 2:
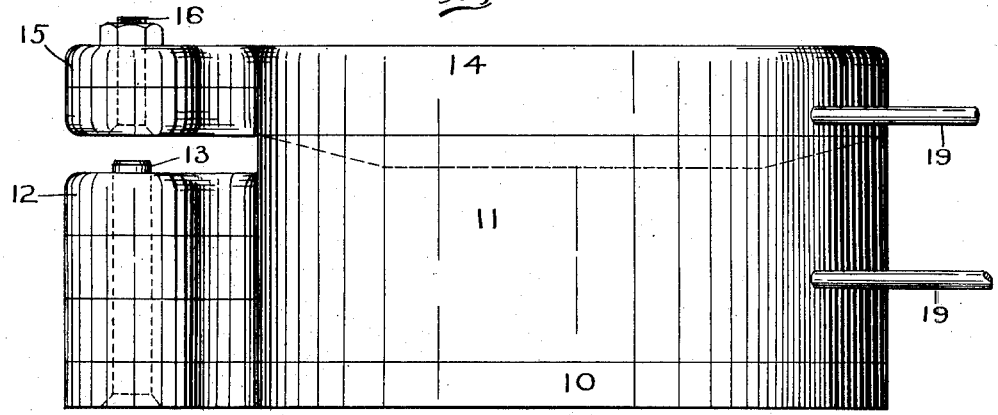
Figure 3:
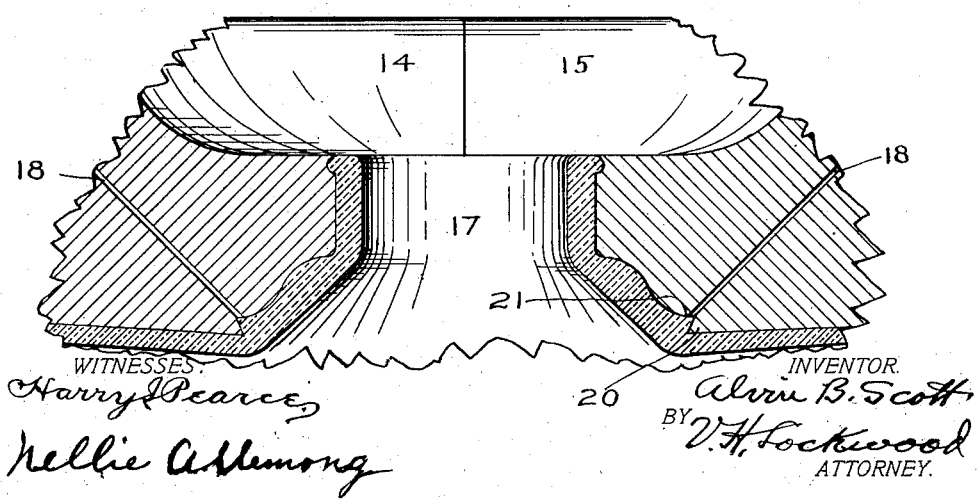

Figure 1 is a central vertical transverse section through the mold for making lamp-fonts with a lamp-font therein in section. Fig. 2 is a side elevation of the mold. Fig. 3 is a portion of Fig. 1, shown on an enlarged scale to more fully explain the novel idea.

In Fig. 1 there is shown a base 10, with a central upward extension to constitute a bottom for the mold upon which the glass article is blown. Upon this base two sections 11 of the mold are loosely placed or mounted, with rear extensions or ears 12, through which the pin 13, extending upward from the base, passes to form a hinge for said sections of the mold. The upper surface of these sections 11 is inclined, as shown in Fig. 1, inward and downward. Other mold-sections 14 are placed loosely on the mold-sections 11 and have rear extensions or ears 15, pivoted on the pin 16. The lower surfaces of the sections 14 are inclined inwardly and downwardly to fit snugly on the upper surfaces of the lower sections 11. The inner surfaces of these various sections 10, 11, and 14, constituting the mold, are formed to give the desired shape or ornamentation to the glass article blown, such as the lamp-font 17. It is common to make the upper surface of such a lamp-font depressed somewhat in the inner portion thereof, as shown.

18 represents air-holes to let air escape from the recesses in the inner surface of the mold-sections, and 19 represents handles whereby the mold-sections are opened and closed.

I provide on the upper mold-sections a lip 20, extending around the inner surface of the mold and projecting inward, with one face receding and extending at an acute angle to the general direction of the inner surface of the mold, so as to form in the glass article an overhanging ledge or lip 21. When the glass is blown, it will be forced into the recess formed by said lip 20 of the mold, so as to form the overhanging ledge 21 in the glass article, and that ledge will rest upon and be held upward by the annular lip 20 of the mold, so that the upper surface of the lamp-font will be held in its upper position and maintain that position before the glass is hardened and while it is hardening. Therefore as soon as the blower has blown the article into shape he can stop blowing, and the mold by reason of the lip 20 will hold the article in position without any further blowing by him. This relieves the blower, saves his time, and insures a uniformly perfect article.

What I claim as my invention, and desire to secure by Letters Patent, is—

A mold for hollow glass articles having a broad substantially horizontal top, the upper horizontal inner surface of said mold being provided with an inwardly-projecting lip with one face of said lip receding at an acute angle to the surface of the mold to support the top of the glass article before it cools.

In witness whereof I have hereunto affixed my signature in the presence of the witnesses herein named.

ALVIN B. SCOTT.

Witnesses:
W. C. GORDON,
D. R. JONES.